United States Patent
Lin et al.

(10) Patent No.: US 12,152,843 B2
(45) Date of Patent: Nov. 26, 2024

(54) PASSIVE RADIATIVE COOLING CERAMIC

(71) Applicant: City University of Hong Kong, Kowloon (HK)

(72) Inventors: Kaixin Lin, Kowloon (HK); Siru Chen, Kowloon (HK); Tong Zhu, Tseung Kwan O (HK); Yihao Zhu, Kowloon (HK); Hau Him Lee, New Territories (HK); Tsz Chung Ho, New Territories (HK); Chi Yan Tso, Tsuen Wan (HK)

(73) Assignee: City University of Hong Kong, Kowloon (HK)

( * ) Notice: Subject to any disclaimer, the term of this patent is extended or adjusted under 35 U.S.C. 154(b) by 8 days.

(21) Appl. No.: 17/879,878

(22) Filed: Aug. 3, 2022

(65) Prior Publication Data
US 2024/0044593 A1 Feb. 8, 2024

(51) Int. Cl.
*F28F 13/18* (2006.01)
*F28F 21/04* (2006.01)

(52) U.S. Cl.
CPC ............ *F28F 21/04* (2013.01); *F28F 13/185* (2013.01); *F28F 2245/06* (2013.01)

(58) Field of Classification Search
CPC ...................................... F28F 13/18
See application file for complete search history.

(56) References Cited

U.S. PATENT DOCUMENTS

| 10,941,990 B2 | 3/2021 | Raman et al. |
| 2019/0017758 A1 | 1/2019 | Raman et al. |
| 2021/0078038 A1* | 3/2021 | Mandal ............... C09D 127/16 |

FOREIGN PATENT DOCUMENTS

| CN | 104196193 | 12/2014 |
| CN | 113416521 A | * 9/2021 |
| CN | 114672205 A | * 6/2022 |

OTHER PUBLICATIONS

Wang, T., Wu, Y., Shi, L., Hu, X., Chen, M., & Wu, L. (2021). A structural polymer for highly efficient all-day passive radiative cooling. Nature communications, 12(1), 365.
Chen, K., Qin, H., & Ren, Z. (2023). Establishment of the microstructure of porous materials and its relationship with effective mechanical properties. Scientific Reports, 13(1), 18064.

(Continued)

*Primary Examiner* — Eric S Ruppert
(74) *Attorney, Agent, or Firm* — Renner, Kenner, Greive, Bobak, Taylor & Weber

(57) ABSTRACT

A radiative cooling apparatus including a layer of a material. The layer defines an exterior face. The material has a composition such that the layer is configured to reflect, at the exterior face, at least partly of the incoming electromagnetic radiation of at least some wavelengths in the solar spectrum. The layer is further configured to emit thermally-generated electromagnetic emission of at least some mid-infrared wavelengths out from the exterior face. Ceramics provided by embodiments of the invention could produce extra cooling effect without any electricity consumption, creating a prominent benefit to the energy saving of air conditioning systems of buildings.

10 Claims, 4 Drawing Sheets

(56) References Cited

OTHER PUBLICATIONS

Cheng, Z., Shuai, Y., Gong, D., Wang, F., Liang, H., & Li, G. (2021). Optical properties and cooling performance analyzes of single-layer radiative cooling coating with mixture of TiO2 particles and SiO2 particles. Science China Technological Sciences, 64(5), 1017-1029.
Chen, M., Pang, D., Chen, X., Yan, H., & Yang, Y. (2022). Passive daytime radiative cooling: Fundamentals, material designs, and applications. EcoMat , 4(1), e12153.
Pham, VT, & Fang, TH (2021). Understanding porosity and temperature induced variabilities in interface, mechanical characteristics and thermal conductivity of borophene membranes. Scientific reports, 11(1), 12123.).
(Main article) Lin, K., Chen, S., Zeng, Y., Ho, T. C., Zhu, Y., Wang, X., Liu, F., Huang, B., Chao, C. Y.- H., Wang, Z., & Tso, C.Y. (2023). Hierarchically structured passive radiative cooling ceramic with high solar reflectivity. Science, 382 (6671), 691-697.
(Supplemental Information) Lin, K., Chen, S., Zeng, Y., Ho, T. C., Zhu, Y., Wang, X., Liu, F., Huang, B., Chao, C. Y.-H., Wang, Z., & Tso, C.Y. (2023). Hierarchically structured passive radiative cooling ceramic with high solar reflectivity. Science, 382(6671), 691-697. h.

* cited by examiner

PASSIVE RADIATIVE COOLING CERAMIC

FIELD OF INVENTION

This invention relates to construction materials, and in particular to radiative cooling materials.

BACKGROUND OF INVENTION

Energy consumption in buildings accounts for more than 34% of the intensifying global energy demand. Meanwhile, the cooling load accounts for more than 50% of that energy consumption in buildings, and accumulated greenhouse gases exacerbate urban heat island effect of a city. The refrigerants that are widely used in traditional air-conditioners and refrigerators, intensify climate change and ozone depletion. Therefore, it is urgent to mitigate the intense energy consumption of conventional air-conditioning cooling systems and eliminate the use of refrigerants.

Passive radiative cooling is a potential cooling technology that needs no electricity input. It is the process of heat removal from a sky-facing surface through radiation to the cold universe (−270° C.), cooling the surface below ambient temperature. As a practical technology, passive radiative cooling has been applied on green buildings as the sub-ambient cooling source without noise, refrigerants, or energy consumption. However, there are some drawbacks associated with conventional radiative cooling techniques which are difficult to overcome, including limited peak of emission region, unsatisfactory cooling power, unsuitable or expensive for large-scale production, and complex, inefficient manufacturing method.

SUMMARY OF INVENTION

Accordingly, the present invention, in one aspect, is a radiative cooling apparatus including a layer of a material. The layer defines an exterior face. The material has a composition such that the layer is configured to reflect, at the exterior face, at least partly of the incoming electromagnetic radiation of at least some wavelengths in the solar spectrum. The layer is further configured to emit thermally-generated electromagnetic emission of at least some mid-infrared wavelengths incident out from the exterior face.

In some embodiments, the layer contains a porous structure.

In some embodiments, the material is homogenous at least along one direction.

In some embodiments, the material is ceramic, and the composition includes a metal oxide.

In some embodiments, the porous structure has a porosity of 60%-90%.

In some embodiments, the porous structure has a pore distribution of 50 nm-10 μm.

In some embodiments, the material has a substantially white color.

In some embodiments, the radiative cooling apparatus further includes a color glaze attached to the exterior face of the material.

According to another aspect of the invention, there is provided a method of preparing a radiative cooling material, which includes the steps of providing an organic solution containing a polymer, adding a metal oxide into the organic solution to form a suspension, conducting a phase inversion process of the suspension to form a precursor; and sintering the precursor to obtain the radiative cooling material.

In some embodiments, the method further includes, after the step of providing an organic solution containing a polymer, the step of stirring the organic solution using a magnetic stirrer.

In some embodiments, the method further includes, after the step of adding a metal oxide into the organic solution to form a suspension, the step of degassing the suspension with stirring to remove air bubbles in the suspension.

In some embodiments, wherein the step of sintering the precursor to obtain the radiative cooling material, further includes sintering the precursor in an environment in which a temperature steadily rising from room temperature to 1000° C. at a rate of 5° C./minute, and then maintained at 1000° C. for 3 hours.

In some embodiments, the method further includes supplying air to the environment at a rate of at 200 ml/min.

According to a further aspect of the invention, there is provided a method of glazing a radiative cooling material. The method includes the steps of providing a radiative cooling material, applying a water-based glaze solution on an exterior face of the radiative cooling material; and sintering the radiative cooling material to obtain a glazed material.

Embodiments of the invention therefore provide a scalable-manufactured high-performance passive radiative cooling ceramic (PRCC), which is a novel ceramic with passive radiative cooling effect. It is not only environmentally friendly and low-cost, but also aesthetically pleasing with different colors. Passive radiative cooling has the merits of zero energy consumption, zero pollution, no mechanical parts, and shows significant energy saving for conventional cooling systems. Therefore, passive radiative cooling ceramics according to embodiments of the invention are significantly beneficial to indoor environmental comfort, global energy crisis mitigation, urban climate improvement, and reduction of greenhouse gases and waste.

The foregoing summary is neither intended to define the invention of the application, which is measured by the claims, nor is it intended to be limiting as to the scope of the invention in any way.

BRIEF DESCRIPTION OF FIGURES

The foregoing and further features of the present invention will be apparent from the following description of embodiments which are provided by way of example only in connection with the accompanying figures, of which.

DETAILED DESCRIPTION

Figure 1:
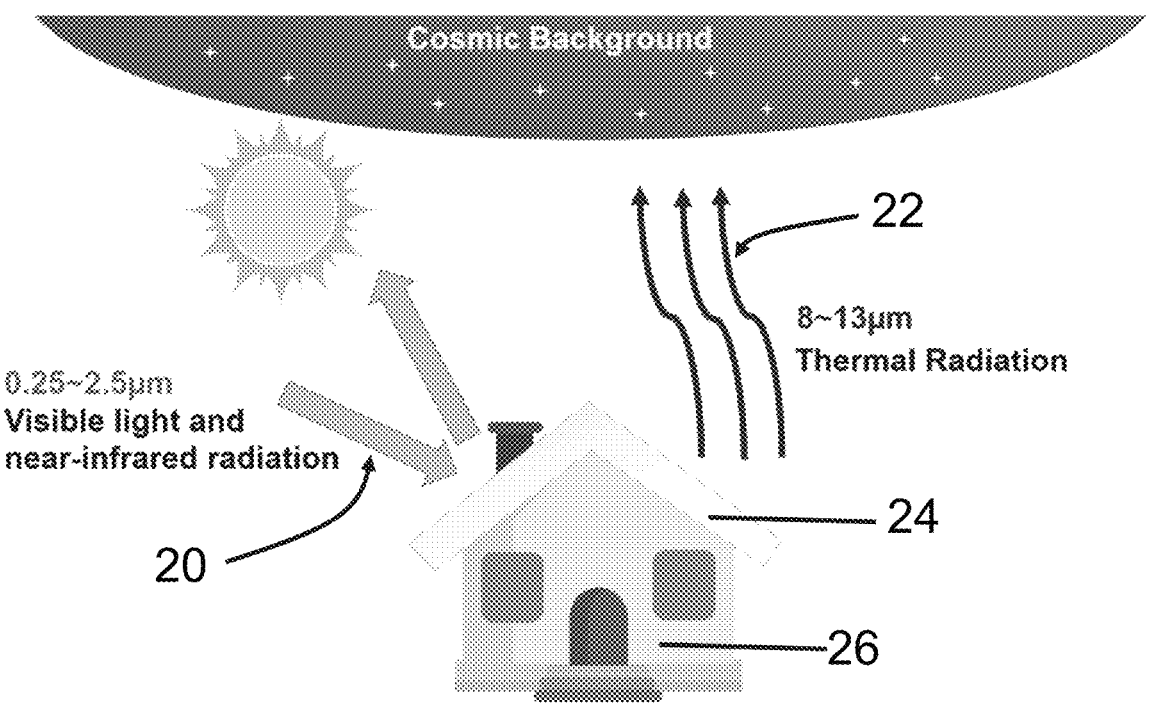
FIG. 1 shows the working principle of a passive radiative cooling ceramic according to an embodiment of the invention.
Figure 2:
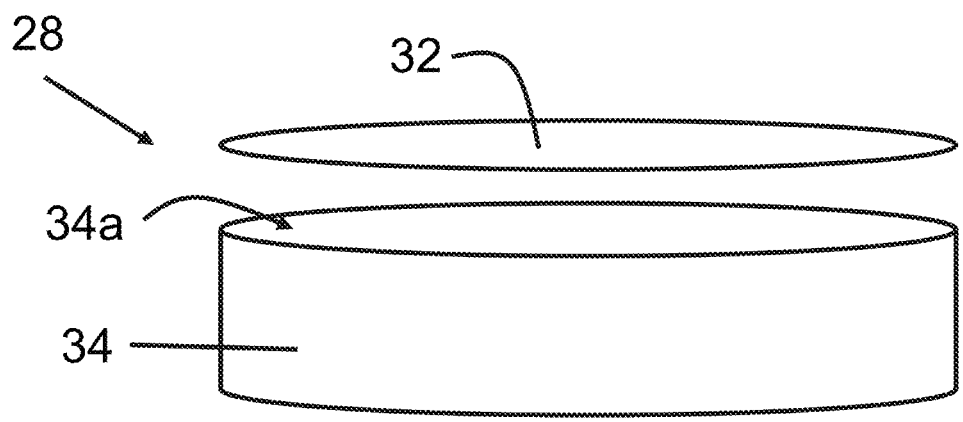
FIG. 2 is the illustration of the passive radiative cooling ceramic in FIG. 1, together with a color glazing configured at one side of the ceramic.

A radiative cooling apparatus 28 based on a passive radiative cooling ceramic according to a first embodiment of the invention is illustrated in FIGS. 1-2. Passive radiative cooling is the process of heat removal, through radiation, from a sky-facing surface to the universe, where the temperature is approximately −270° C., cooling the surface below ambient temperature. Scientifically, all objects with temperature above −270° C. can spontaneously emit radiation heat. For a terrestrial object (−40~40° C.), outgoing radiation mainly concentrates at the wavelength of 8-13 μm where the earth atmosphere is almost transparent. In this case, emitted radiation heat can easily escape to the cold outer space for cooling. During the nighttime, under conditions of low parasitic heat loss, surface cooling effect is relatively easy to obtain since passive radiative cooling plays a dominating role in heat balance. In contrast, at daytime, a passive radiative cooler is required to reflect intensive solar irradiation (e.g., ultraviolet, visible light and near-infrared radiation), of a wavelength mainly between 0.25-2.5 μm, as well as to strongly emit the thermal radiation in the 8-13 μm atmospheric window. Due to the effects of high thermal radiative emission and significant sunlight reflection, the passive radiative cooler can passively generate a cooling effect even under direct sunlight.

The radiative cooling apparatus 28 as a passive radiative cooler has a general tile shape and is not explicitly shown in FIG. 1 as it is installed on a roof 24 of a house 26. The house 26 has an interior space (not shown) that has thermal radiation 22 generated therein, for example by human activities, use of electronic appliances, or just ambient temperature. At the same time, the sun emits visible light and near-infrared solar radiation 20 to the earth, and the solar radiation 20 sometimes brings unwanted heat and increases the demand for cooling in the internal space of the house 26. The radiative cooling apparatus 28 is installed at external surfaces of the roof 24 to decrease the heat load of the house 26, by reflecting the solar irradiation 20 (i.e., ultraviolet, visible light and near-infrared radiation), as well as emitting the thermal radiation 22 in an 8-13 μm atmospheric window, thus achieving a passive radiative cooling effect without the need of any energy consumption. The atmospheric window offers high transmittance in the atmosphere layer that enables terrestrial thermal radiation (e.g., the thermal radiation 22) to pass through.

The structure of the radiative cooling apparatus 28 is illustrated in FIG. 2. For the sake of easy reference, the apparatus 28 is shown to have a generally cylinder shape in FIG. 2, but one should note that the shape of the apparatus 28 could be arbitrary (e.g., square, rectangle, polygon, etc.) and so is the dimension of the apparatus 28, as long as it is suitable for use in constructions and on buildings. The apparatus 28 includes a layer 34 of a ceramic material, and as shown in FIG. 2 the layer 34 has a cylinder shape defining an exterior face 34a. The exterior face could refer to one or more of the surfaces of the cylinder such as its top, its bottom, and its side surfaces. The exterior face of the layer 34 is also the exterior face of the apparatus 28. With the special composition of the ceramic (as will be explained in detailed later), the layer 34 is configured to reflect at its exterior face 34a incoming electromagnetic radiation of at least some wavelengths in the solar spectrum (e.g., from the solar radiation 20). The layer 34 is further configured to emit thermally-generated electromagnetic emission of at least some mid-infrared wavelengths (e.g., from the thermal radiation 22) out from the exterior face 34a. In this way, when the apparatus 28 is installed at the roof 24 of the house 26 in FIG. 1, the apparatus 28 will effectively reflect radiations with wavelengths in the solar spectrum in the ultraviolet, visible, and near-infrared range (solar range), help reduce heat gain from sunlight, and at the same time emit radiations with wavelengths in the mid-infrared region from the internal space to the cold universe. It should be noted that all the surfaces of the layer 34 are adapted to reflect radiations with at least some wavelengths in the solar spectrum. However, when the apparatus 28 is installed to a building (e.g., its roof), a bottom surface is not exposed to sunlight, so the bottom surface is not reflecting the sunlight. Depending on the installation of the apparatus 28, may be part of the side surface is exposed to sunlight. In comparison, all surfaces of the apparatus 28 when it is installed on a building allow thermally-generated electromagnetic emissions to pass therethrough, because all such emissions coming from the interior of the building will enter the layer 34 from the bottom surface, and then emit out of the layer 34 from other surfaces.

Also shown in FIG. 2 is a color glazing 32 being part of the radiative cooling apparatus 28 which is formed on a top surface of the layer 34. For the sake of clear illustration, the color glazing 32 is separated from the layer 34 in FIG. 2. In this embodiment, the ceramic of the layer 34 has a ultrawhite color, but with the color glazing 32 the apparatus 28 appears in a desired color to maintain building aesthetics as well as achieve high cooling performance.

Figure 3A:
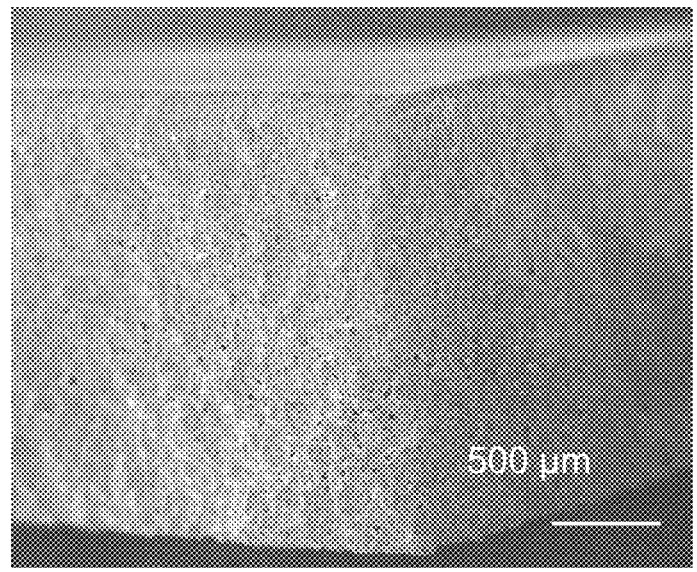
FIG. 3a shows the scanning electron microscope (SEM) image of the cross section of a sample of the radiative cooling ceramic according to another embodiment of the invention, with a scale bar of 500 μm.
Figure 3B:
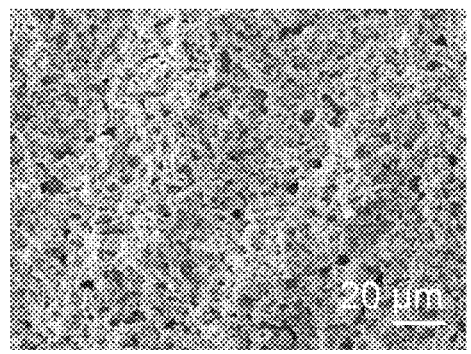
FIG. 3b shows the SEM image of the top section of the sample in FIG. 3a, with a scale bar of 20 μm.

Turning to the ceramic material of the layer 34, as mentioned above the ceramic is an ultra-white ceramic, and it has a porous structure (as shown in FIGS. 3a-3b) with a porosity above 70%. FIG. 3a shows a micro-scale porous structure, and FIG. 3b shows a nano-scale porous structure. The micro-scale and nano-scale porous structure would significantly enhance the light scattering efficiency, contributing to effective solar reflection. As clearly shown in FIG. 3a, the ceramic material is homogenous along all directions, and at least along a thickness direction (i.e. along the vertical direction in FIG. 3a).

In this embodiment, the radiative cooling ceramic in substantially white color is essentially composed of alumina ($Al_2O_3$). The metal oxide provides the high reflectivity in the solar spectrum and high emissivity of thermally-generated electromagnetic emission at the exterior face of the ceramic, as mentioned below. The white color as understood by skilled persons help reflect sunlight as compared to other colors. The thickness of the ceramic can be approximately 100 μm-50,000 μm, depending on the application scenarios. The shape of the radiative cooling ceramic can be customized during the fabrication process according to the shape of the molds, as mentioned above.

The ceramic has a high reflectivity in the solar wavelength range (0.25~2.5 μm), namely ultraviolet (3% of solar radiation), visible (44% of solar radiation) and near-infrared (53% of solar radiation) light, and high emissivity in the mid-infrared wavelength range (8~13 μm). Therefore, when applied on roofs or exterior walls of buildings, it can produce a cooling effect via radiation even under direct intense solar irradiance. A preliminary field investigation based on a prototype of the ceramic shows that the ceramic (without any color glazing) could realize around 4° C. average sub-ambient temperature throughout a day with 140 W/m² cooling power. Compared with conventional ceramic tiles, the ceramic achieves ~5° C. temperature reduction, showing a significant cooling performance. Even with the color glazing, the colored ceramics (e.g., red, yellow, green) also exhibit superior performance with 3.1~4.9° C. lower temperature than conventional ceramic tiles of the same color. In another field investigation, after applying the radiative cooling ceramic on the rooftop of a building, the roof surface temperature was reduced by 15° C. compared to the bare rooftop surface under direct sunlight, leading to a saving of 9.4% of building cooling energy.

Figure 4:
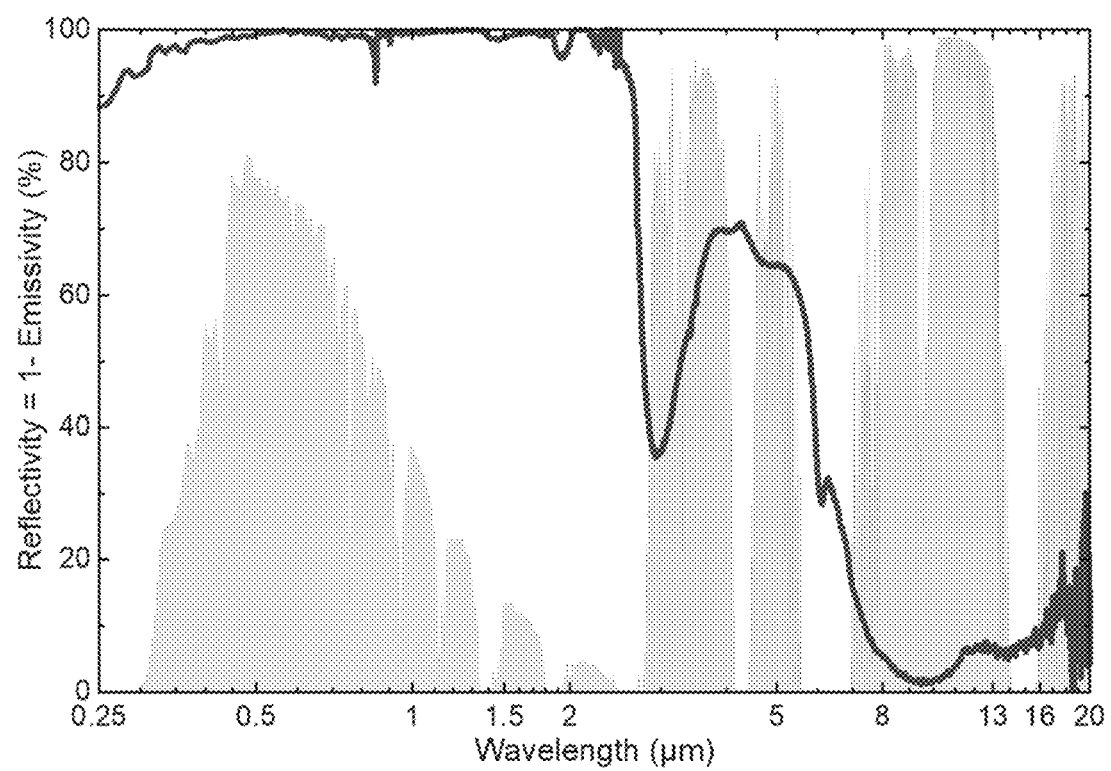
FIG. 4 illustrates the spectral reflectivity of the passive radiative cooling ceramic in FIGS. 3a-3b.

The spectral emissivity and reflectivity of the passive radiative cooling ceramic (in white) in the apparatus 28 are shown in FIG. 4. High reflectivity in the ultraviolet, visible, and near-infrared range (solar range) can reduce heat gain from sunlight, and high emissivity in the mid-infrared range can enhance heat dissipation of the object. As shown in FIG. 4, the radiative cooling ceramic has 99.6% average solar reflectivity and 96.5% mid-infrared emissivity, showing a significant performance for achieving radiative cooling effect. The white radiative cooling ceramic can be colored via glazing. The colored radiative cooling ceramic can still achieve 10%~24% higher solar reflectivity than a conventional colored ceramic tile depending on the color.

The ceramic described in the embodiment above therefore uses a cellular porous structure and the properties of the metal oxide (e.g., $Al_2O_3$) to realize high reflectivity in the ultraviolet, visible, and near-infrared region and high emissivity in the mid-infrared region to achieve a radiative cooling effect during daytime and nighttime. There are many advantages of the ceramic in comparison with traditional building cooling techniques, as summarized below:

Environmentally friendly: because the passive radiative cooling ceramic is a refrigerant-free cooling technology, it is harmless to the environment, leading to zero ozone depletion, and most importantly, relieving global warming.

Energy efficient technology: the electricity consumption of the buildings from conventional AC systems can be significantly decreased because of zero energy consumption of the passive radiative cooling ceramic.

High cooling performance: the ceramic in ultra-white color shows a high reflectivity (>99/o) in visible light and near-infrared region to strongly reflect the solar irradiance, meanwhile it also has an extremely high emissivity (>96%) in the mid-infrared region to dissipate thermal energy to the cold universe for cooling. In this case, the PRCC could provide a net cooling power of about 140 $W/m^2$ experimentally. For color-glazed ceramics, the solar reflections are still 10%~24% higher than commercial colored ceramic tiles of the same color. Compared with commercial colored ceramic tiles, the colored passive radiative cooling ceramic achieves a 3.1~4.8° C. temperature reduction under the direct sunlight.

Quiet: traditional air conditioning systems are of a mechanical transmission structure, which cause a lot of noise during operation. However, the passive radiative cooling ceramic is silent during the cooling process.

Intrinsic weathering and fouling resistance: the passive radiative cooling ceramic has excellent stability and physical strength (i.e., washable and waterproof) to be applied on the facade of buildings (i.e., rooftops, exterior walls, etc.) as a cooling ceramic without being easily damaged or degraded.

Aesthetically pleasing: the passive radiative cooling ceramic is adapted to display any color by glazing, which achieves a higher cooling performance compared with conventional ceramic tiles of an identical color.

Excellent strength: the ceramic could withstand high temperatures and acidic materials, making it suitable for application to building facades.

Figure 5:
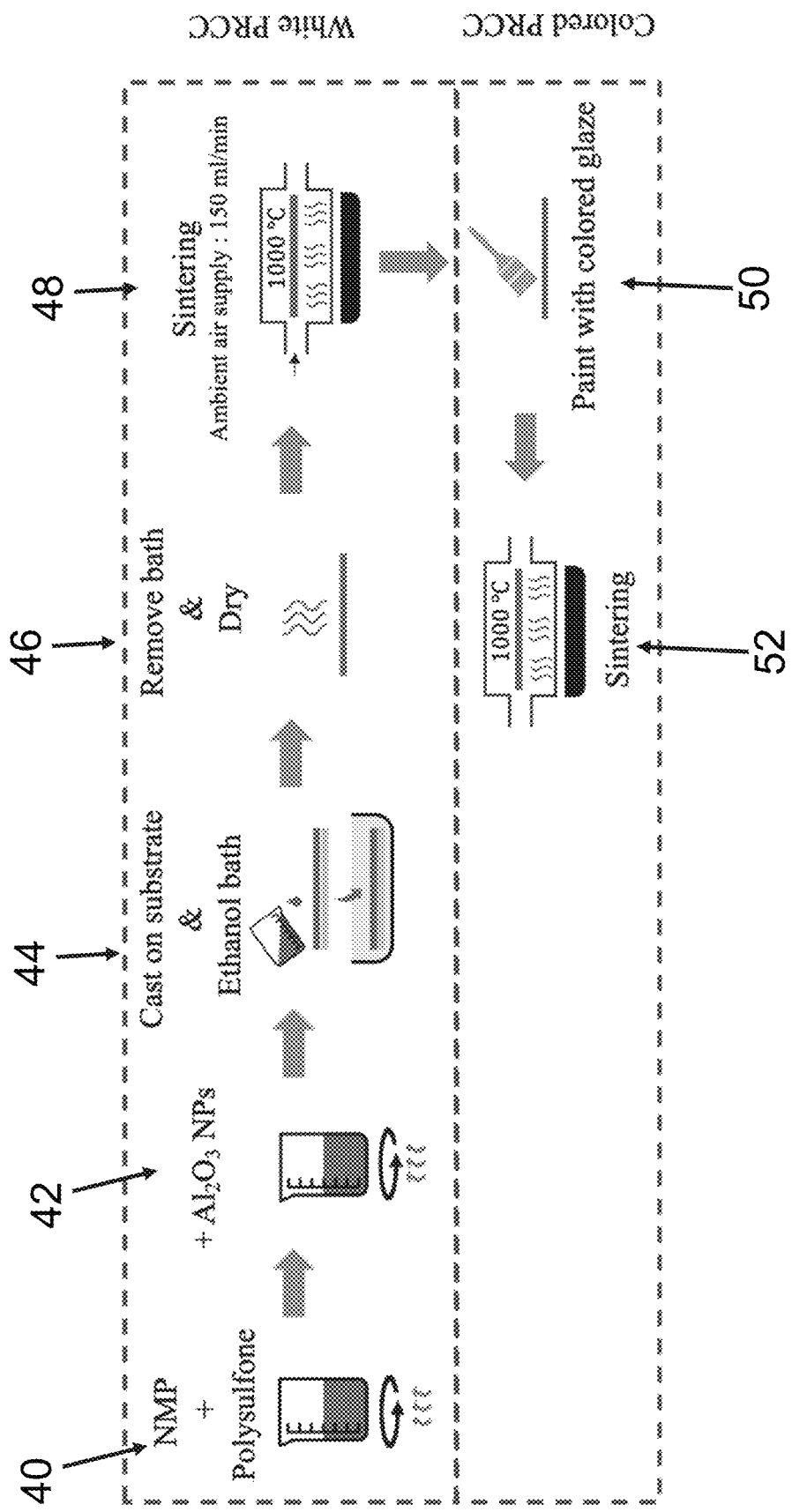
FIG. 5 illustrates steps of a method of preparing a passive radiative cooling ceramic according to a further embodiment of the invention.

Next, a method of fabricating a passive radiative cooling ceramic according to another embodiment of the invention will be introduced. The method can be used to fabricate the ceramic in FIG. 2, but of course this is by no means limiting. Referring to FIG. 5, the method starts with Step 40, in which a polymer (e.g., PESF (polyethersulfone), PVDF (polyvinylidene difluoride) and PMMA (poly(methylmethacrylate))) that is prepared and dried is dissolved in an organic solution (e.g., NMP (methylpyrrolidone), acetone, and DMF (dimethylformamide). The organic solution is then stirred by a magnetic stirrer (not shown) till a homogeneous transparent solution is formed. As a specific example, FIG. 5 shows that the polymer is polysulfone and the organic solution is NMP. Next, in Step 42, a high reflective metallic oxide (e.g., $Al_2O_3$, $TiO_2$, ZnO) is added into the homogeneous transparent solution obtained in Step 40 and stirred till the particles are evenly dispersed without obvious agglomeration. As a specific example, FIG. 5 shows that the metal oxide is $Al_2O_3$ nano-particles ($Al_2O_3$NPs). After this step, the suspension is obtained, and the suspension is degassed with slow stirring to remove any air bubbles.

In Step 44, the prepared suspension obtained in Step 42 is cast on a mold as a substrate, and immersed in ethanol for at least 24 hours to complete the phase inversion process. Different thickness of the solidified ceramic precursor in Step 44 can be obtained by using different film applicators. As those skilled in the art understand, the film applicators are devices that can produce a uniform thickness of solution on the substrate. Then the solidified ceramic precursor obtained is removed from the ethanol bath, and dried at room temperature for at least 24 hours in Step 46. The precursor is then cut into desired shapes (e.g., the cylindrical shape as shown in FIG. 2) before sintering.

In Step 48, the sintering process is conducted in a furnace with the temperature steadily rising from room temperature to 1000° C. at a rate of 5° C./minute, then maintained at 1000° C. for 3 hours before being cooled down to room temperature. During the sintering process in Step 48, the air supply rate to the furnace chamber is controlled at 200 ml/min to ensure the polymer is completely burned-off during the sintering. After the sintering process is completed, the white ceramic is prepared, for example as the one shown in FIGS. 3a-3b.

If the passive radiative cooling ceramic needs to be colored, then the method further goes on to glaze the passive radiative cooling ceramic obtained in Step 48. In particular, in Step 50 the obtained white ceramic is applied with a water-based glaze solution of different color on the surfaces. In Step 52, the ceramic applied with colored glaze is put into the furnace, followed by sintering for 3-hours at 1000° C.

One can see that the fabrication process of the ceramic in the embodiment above is relatively simple compared to conventional ceramic tiles, with a relatively low material cost and intrinsic weathering and fouling resistance.

The exemplary embodiments are thus fully described. Although the description referred to particular embodiments, it will be clear to one skilled in the art that the invention may be practiced with variation of these specific details. Hence this invention should not be construed as limited to the embodiments set forth herein.

While the embodiments have been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the embodiment shown in FIG. 1 above, the radiative cooling apparatus containing the passive radiative cooling ceramic is applied on the rooftop of the house. However, those skilled in the art should understand that the radiative cooling apparatus can be installed to any exterior surface of buildings in any form. For example, the radiative cooling apparatus can be installed to external walls of skyscrapers.

In the preferred embodiments described above, the metal oxide in the composition of the ceramic includes $Al_2O_3$, $TiO_2$ and ZnO. The invention is not limited to the use of these specific metal oxide. Rather, any other metal oxide that has a high reflective characteristic may be used for the ceramic material.

In the preferred embodiments described above, the porosity of the porous structure of the ceramic is described to be above 70%. Those skilled in the art should realize that the porosity can be different in variations of the preferred embodiments, for example the porosity could be in the range of 60%-90%. Similarly, the pore distribution in the porous structure could be in the range of 50 nm-10 μm.

What is claimed is:

1. A radiative cooling apparatus comprising a layer of a ceramic material; the layer defining an exterior face; the ceramic material comprising a metal oxide having a composition such that the layer is configured to reflect, at the exterior face, at least part of an incoming electromagnetic radiation of at least some wavelengths in the solar spectrum; the layer further configured to emit thermally-generated electromagnetic emission of at least some mid-infrared wavelengths out from the exterior face, wherein the material comprises a porous structure and is homogenous along all directions; wherein the porous structure has a porosity of 60%-90% and a pore distribution of 50 nm-10 μm.

2. The radiative cooling apparatus of claim 1, wherein the porous structure has a porosity of 70%.

3. The radiative cooling apparatus of claim 1, wherein the ceramic material has a substantially white color.

4. The radiative cooling apparatus of claim 1, further comprises a color glaze attached to the exterior face of the ceramic material.

5. A method of preparing a radiative cooling material according to claim 1, comprising the steps of:
   a) providing an organic solution containing a polymer;
   b) adding a metal oxide into the organic solution to form a suspension;
   c) conducting a phase inversion process of the suspension to form a precursor; and
   d) sintering the precursor to obtain the radiative cooling material.

6. The method of claim 5, further comprises, after step a), the step of stirring the organic solution using a magnetic stirrer.

7. The method of claim 5, further comprises, after step b), the step of degassing the suspension with stirring to remove air bubbles in the suspension.

8. The method of claim 5, wherein step d) further comprising sintering the precursor in an environment in which a temperature steadily rising from room temperature to 1000° C. at rate of 5° C./minute, and then maintained at 1000° C. for 3 hours.

9. The method of claim 8, wherein step d) further comprising supplying air to the environment at a rate of at 200 ml/min.

10. A method of glazing a radiative cooling material, comprising the steps of:
    a) providing a radiative cooling material prepared according to claim 5;
    b) applying a water-based glaze solution on an exterior face of the radiative cooling material; and
    c) sintering the radiative cooling material to obtain a glazed material.

* * * * *